Figure 1:
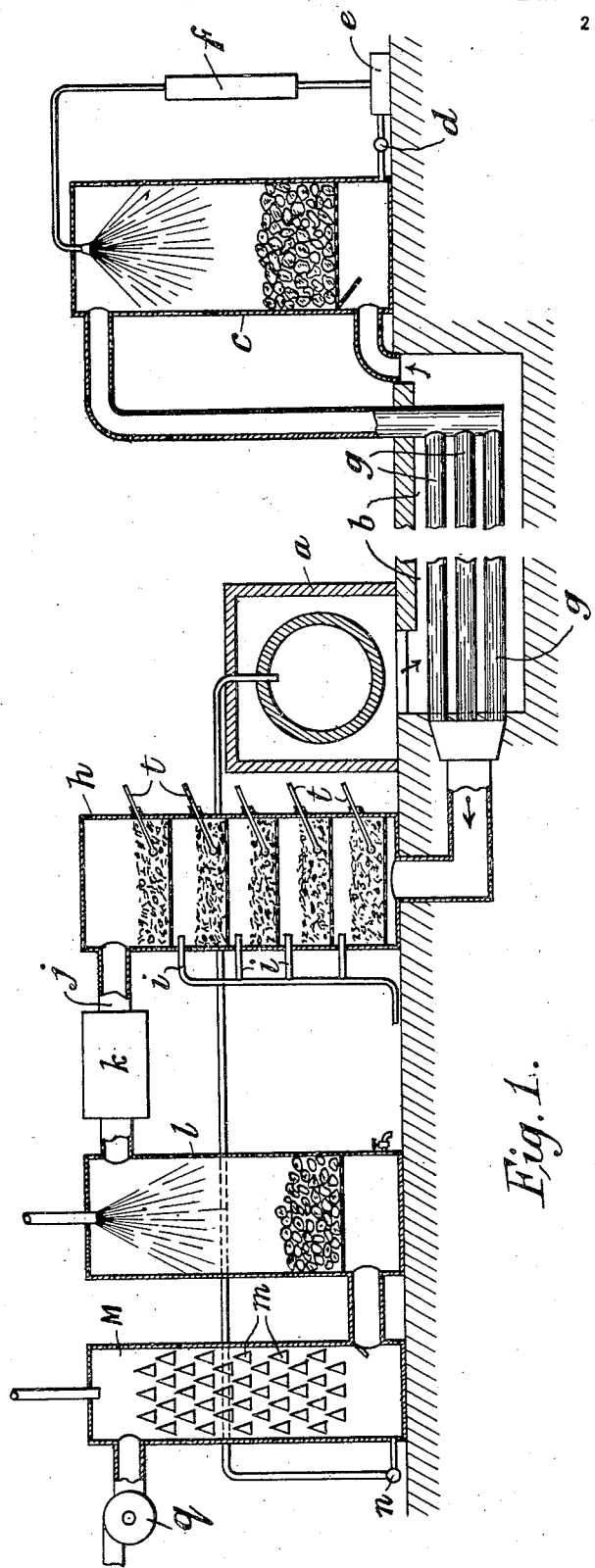

L. P. BASSET.
PROCESS FOR THE MANUFACTURE OF SULFURIC ACID.
APPLICATION FILED JULY 5, 1916.

1,197,331.

Patented Sept. 5, 1916.
2 SHEETS—SHEET 1.

Inventor
L. P. Basset.
By H. R. Kerslake
Attorney

L. P. BASSET.
PROCESS FOR THE MANUFACTURE OF SULFURIC ACID.
APPLICATION FILED JULY 5, 1916.

1,197,331.

Patented Sept. 5, 1916.

L. P. Basset.
Inventor.
By L. R. Kerslake
Attorney.

UNITED STATES PATENT OFFICE.

LUCIEN PAUL BASSET, OF PARIS, FRANCE.

PROCESS FOR THE MANUFACTURE OF SULFURIC ACID.

1,197,331.

Specification of Letters Patent. Patented Sept. 5, 1916.

Application filed July 5, 1916. Serial No. 107,597.

*To all whom it may concern:*

Be it known that I, LUCIEN PAUL BASSET, of 92 Rue de la Victoire, Paris, in the Republic of France, chemical engineer, have invented Improvements in the Process for the Manufacture of Sulfuric Acid, of which the following is a full, clear, and exact description.

This invention has for its object to provide an improved process and apparatus for the manufacture of sulfuric acid based on the conversion of sulfurous gases mixed with an excess of oxygen, into sulfuric acid or sulfuric acid anhydrid by passing them over a catalytic substance of any kind.

The improved process consists substantially in passing the sulfurous gases, charged with an excess of oxygen, over a catalytic substance of any kind, for instance iron oxid, and then after the oxidation of a portion of this sulfurous gas, separating the sulfuric acid thereby produced, and collecting the sulfurous gases which have escaped oxidation, in order to return them again over a catalytic substance, in such a manner as to effect a complete utilization of the sulfurous gases employed and thus obtain perfect efficiency.

The sulfurous gases thus treated according to the improved process, may be derived either from the roasting of natural sulfids or from sulfur or from the decomposition of gypsum in the manufacture of cement by means of the latter.

This invention is characterized substantially by the manner of recovering the sulfurous gases that have escaped the action of the catalyzer. This manner of recovering consists substantially in sending the gases containing sulfur dioxid which has not been oxidized by the catalyzer, into an apparatus in which there is caused to travel slowly a paste to later be used for the production of cement, which paste may be composed of clay and gypsum or clay and calcium carbonate.

Preferably the improved process for the manufacture of sulfuric acid is effected by oxidizing in any kind of catalyzer the sulfurous gases produced in a cement furnace by the decomposition of calcium sulfate and by passing the sulfurous gases that have not been oxidized in this catalyzer into more of the cement-making paste before its introduction into the furnace, in such a manner that the sulfur dioxid absorbed in the said paste shall be liberated later on by the action of the heat of the furnace and shall pass again into the catalyzer.

The manner in which this invention is to be performed will now be described more fully with reference to the accompanying drawings which illustrate by way of example in a diagrammatic manner various apparatus for carrying the improved process into effect.

Figure 2:
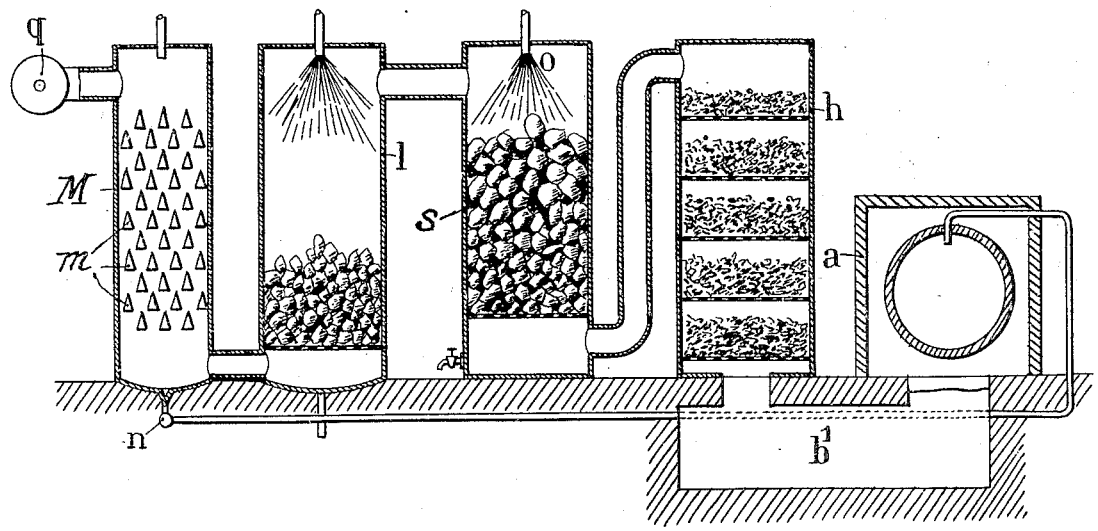
Figure 3:
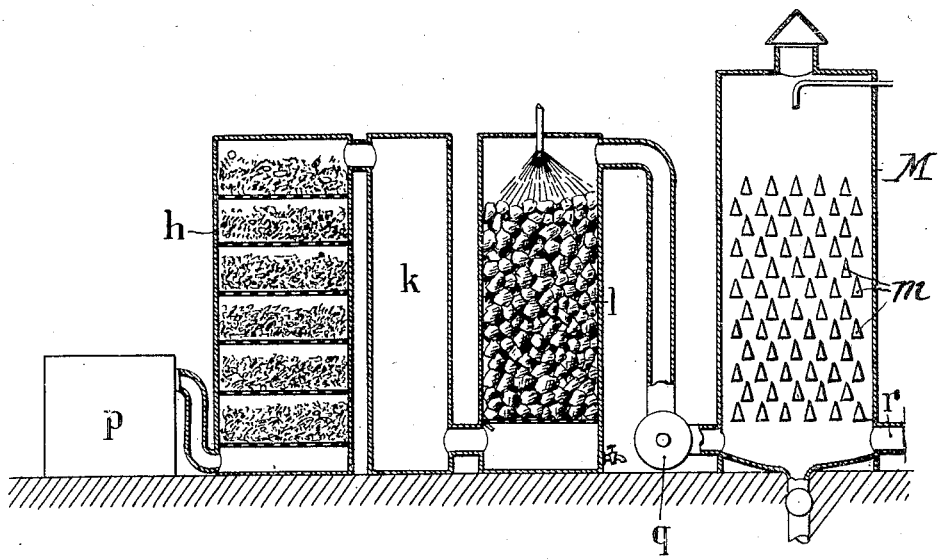

In these drawings:—Figure 1 shows an apparatus for carrying into effect the improved process in the case where the sulfurous gases are supplied by a cement furnace. Fig. 2 shows a modification thereof. Fig. 3 shows an apparatus for use in the case where the sulfurous gases are supplied by a pyrites burner.

Referring first to Fig. 1, the improved apparatus comprises a cement furnace $a$ communicating with a dust chamber $b$ for the gases coming from the said furnace. This dust chamber terminates at the base of a tower $c$ charged with coke over which water is sprinkled. In this tower the water vapor contained in the gases is condensed. In order to avoid any loss of sulfurous acid by dissolution in this water, the same cooling water is used over and over again. The circulation of this water is effected for example by means of a small pump $d$, the water passing through a filter $e$ and a cooling apparatus $f$. Only the water which is condensed from the steam will be discharged hot to the outside.

The upper part of the tower $c$ is connected to a set of tubes $g$ situated in the dust chamber $b$ and therefore heated by the heat of the gases passing therein as they leave the cement furnace $a$. The gases on leaving the tower $c$ are thus heated systematically by the latter gases. The gases may also be heated systematically by the heat of the gases leaving the catalyzer. In such a case the set of tubes would be situated in a chamber adjoining the catalyzer, in which the hot gases would pass before entering the cooler $k$. This arrangement may also be combined with the preceding one. The set of tubes $g$ is connected to the base of a catalyzing apparatus $h$ in which the heated sulfurous gases are oxidized in part and are converted into sulfuric acid anhydrid. Preferably this catalyzing apparatus comprises a number of layers of catalyzing substance, empty spaces being provided between the layers into which air inlet pipes $i$ open with the object of preventing too much rise of temperature due to the oxidation. The admission of air through these pipes is regulated according to the indications of thermometers $t$. Moreover, the oxygen of the air thus admitted promotes the reaction.

From the upper part of the catalyzer chamber $h$, a duct $j$ extends and terminates at a cooling apparatus $k$ of any kind in communication with (say) the upper part of a scrubber $l$ through which either water or a solution of sulfuric acid flows. The sulfuric acid anhydrid generated in the catalyzer chamber $h$ becomes dissolved in the water or acid in this scrubber. Another part (say the lower end) of this scrubber $l$ is connected to a tower M in which are arranged baffles $m$, over which there travels from top to bottom a paste of clay and gypsum or clay and calcium carbonate which is to be treated subsequently in the furnace $a$. The sulfur dioxid which has not been oxidized in the catalyzer are absorbed by this cement paste. As a matter of fact the gypsum in this paste contains almost always a certain proportion of calcium carbonate which when united to the proportion of lime brought in by the clay, is sufficient to absorb the sulfur dioxid that has not been oxidized in the catalyzer chamber $h$.

By causing the paste of clay and gypsum which is to feed the cement furnace $a$, to pass slowly from top to bottom in the tower M, the calcium carbonate contained in the said paste is converted by the action of the sulfurous gases into calcium sulfite, or if the lime has been present in insufficient quantity, into calcium acid sulfite which is soluble in sulfurous acid and which becomes dissolved in the water of the paste. $n$ is a pump which draws from the foot of the tower M, the cement paste that has been converted into sulfite in this way, and delivers it into the cement furnace $a$. The roasting or burning of this paste in the furnace $a$ yields in addition to the sulfur dioxid derived from the decomposition of the sulfite of lime, the sulfurous acid which has escaped the catalyzer and which has been absorbed by this paste. These sulfurous gases then enter the dust chamber $b$ and the same cycle of operations is repeated.

$q$ is a suction fan which is connected to the upper part of the tower M, for drawing the gases through the system.

The paste serving to absorb the sulfur dioxid may perform a cycle which is independent of the furnace. When a certain quantity of paste has been saturated, it is fed into the furnace. Nevertheless the simplest arrangement consists in passing into the tower M a quantity of the paste sufficient to absorb all unoxidized $SO_2$.

If the quantity of calcium carbonate is sufficient to absorb the whole of the sulfur dioxid, the yield of sulfuric acid is complete. If the paste contained an insufficient quantity of calcium carbonate, there is no objection to adding the required quantity, in view of the fact that this additional quantity would always be very small.

In the manner of procedure hereinbefore described the sulfur dioxid gases are almost wholly freed from their water content; therefore sulfuric anhydrid is produced in the catalyzer chamber $h$, together with only a little sulfuric acid.

It would be possible to produce sulfuric anhydrid free from sulfuric acid, by providing, after the tower $c$ a scrubber in which the gases would be dried by a part of the sulfuric acid. This would completely dehydrate the gases.

When it is desired to obtain sulfuric acid directly, it is preferred to employ the apparatus shown in Fig. 2, in which the moist sulfurous gases are immediately oxidized and condensed.

In this apparatus the cement furnace $a$ communicates with a dust chamber $b^1$ which joins directly the catalyzing apparatus $h$. The latter communicates with the base of a scrubber $s$ in which the sulfuric acid coming from the catalyzing apparatus $h$, is condensed by the action of water or acid admitted through the pipe $o$. The scrubber $s$ communicates with a second scrubber $l$ in which the vapor carried over is condensed by the action of a current of cold water which is caused to circulate as above described in connection with the scrubber $c$, in such a manner that the same water is used over again so as to avoid any loss of sulfurous acid.

If the scrubber $s$ is cooled either by the circulation of water or acid supplied through the pipe $o$, or by an external cooling means, the sulfuric acid will be condensed with almost the whole of the steam that is mixed with the sulfurous acid. In this manner there is obtained in this case sulfuric acid having a degree of dilution proportionate to the quantity of water contained in the cement paste. If on the contrary the scrubber $s$ is protected against radiation, only concentrated acid will be condensed in that apparatus, and the steam will be carried on into the adjoining scrubber $l$ where it will be condensed. In this case, the scrubber $s$ will serve the double part of scrubber and concentrating tower.

As in the previously described apparatus, the scrubber $l$ is in communication with the tower M, in which passes the cement paste that is to be treated later on in the furnace a.

The improved process is equally applicable in the case where the sulfur dioxid gases are derived from a pyrites burner; an apparatus such as that shown in Fig. 3 being suitable.

The gases resulting from the roasting of pyrites are passed into the catalyzing tower and, after the resulting sulfuric acid anhydrid has been condensed, the remaining sulfurous acid is absorbed in an ordinary cement paste composed of clay and calcium carbonate and is given up again in the calcination of this paste, whereupon it is oxidized later on for example in a special tower. The unconnected sulfur dioxid in this second tower may be mixed with that from the first tower and both are then absorbed by the cement paste.

It is to be noted that the calcination of the calcium sulfite yields a mixture of calcium sulfate and sulfite before finally being completely decomposed. The burning of this paste, with or without an addition of coal, may be effected according to any approved process.

In Fig. 3, the pyrites burner p is connected to a catalyzing apparatus h after which are provided as in the preceding arrangements a cooling device k, a scrubber l and a tower M in which passes a paste of clay and calcium carbonate which is to be utilized later on in a furnace for the manufacture of cement. The fan q may be interposed on the duct conveying the gases to the tower M as shown in this figure.

On leaving the tower M, the cement paste may be sent into a cement furnace with which there is combined an apparatus similar to that shown in Fig. 1 or Fig. 2, but with the difference that the scrubber l of this apparatus is connected to a pipe r provided at the base of the tower M of the apparatus shown in Fig. 3, in such a manner that the said tower will recover both the sulfurous gases that have escaped from the catalyzer chamber h of the pyrites furnace p and from the catalyzer chamber of the cement furnace.

In carrying the improved process into effect, all catalyzers may be employed which have a yield at least equal to that of iron oxid. Natural hydrated iron oxid is particularly favorable, but it acquires a very great activity when it is mixed with a quarter of its weight of gypsum. After an intimate stirring and mixing it is pressed through a screen perforated with holes of about 1 millimeter in size. In this manner a porous mass is obtained having a large surface which will act as a catalyzer at a lower temperature than iron oxid.

The apparatus and devices hereinbefore described have been mentioned only by way of example, and the shape, dimensions and constructional details of the various pieces of apparatus may be modified according to the different applications.

Claims:

1. A process of producing sulfuric acid which comprises passing gases containing sulfur dioxid and oxygen in contact with a catalytic substance capable of partially oxidizing the sulfur dioxid, removing the so oxidized portion, and thereafter absorbing the unconverted residue of sulfur dioxid in a calcareous material suitable for use in making cement.

2. A process of making sulfuric acid and cement which comprises heating a mixture comprising clay and a material containing calcium sulfate sufficiently to produce cement and gases containing sulfur dioxid, passing the gases containing sulfur dioxid, with a sufficient amount of air to oxidize at least a material portion of said sulfur dioxid in contact with a catalytic substance capable of effecting said conversion, removing the so oxidized portion and thereafter absorbing the nonconverted residue of sulfur dioxid in a calcareous material suitable for use in making cement.

3. A process of making cement and $SO_3$ which comprises heating a mixture containing clay and calcium sulfate sufficiently to produce cement and gases containing sulfur dioxid, passing said gases with air in contact with a catalytic substance comprising natural hydrated iron oxid mixed with gypsum, removing that portion of the sulfur compounds which have been oxidized to the $SO_3$ condition and thereafter absorbing the nonoxidized $SO_2$ in a calcareous material suitable for use in the production of cement.

4. In the process of making sulfuric acid, the step of passing gases containing sulfur dioxid and oxygen in contact with a catalytic substance comprising natural hydrated iron oxid mixed with gypsum.

The foregoing specification of my "Improvements in the process and apparatus for the manufacture of sulfuric acid", signed by me this sixteenth day of June, 1916.

LUCIEN PAUL BASSET.

Witnesses:
FRANCOIS WEBER,
CHAS. P. PRESSLY.